Jan. 29, 1929.  
P. M. MUELLER  
RELIEVING MECHANISM FOR LATHES  
Filed Dec. 29, 1924  
1,700,327  
4 Sheets-Sheet 2
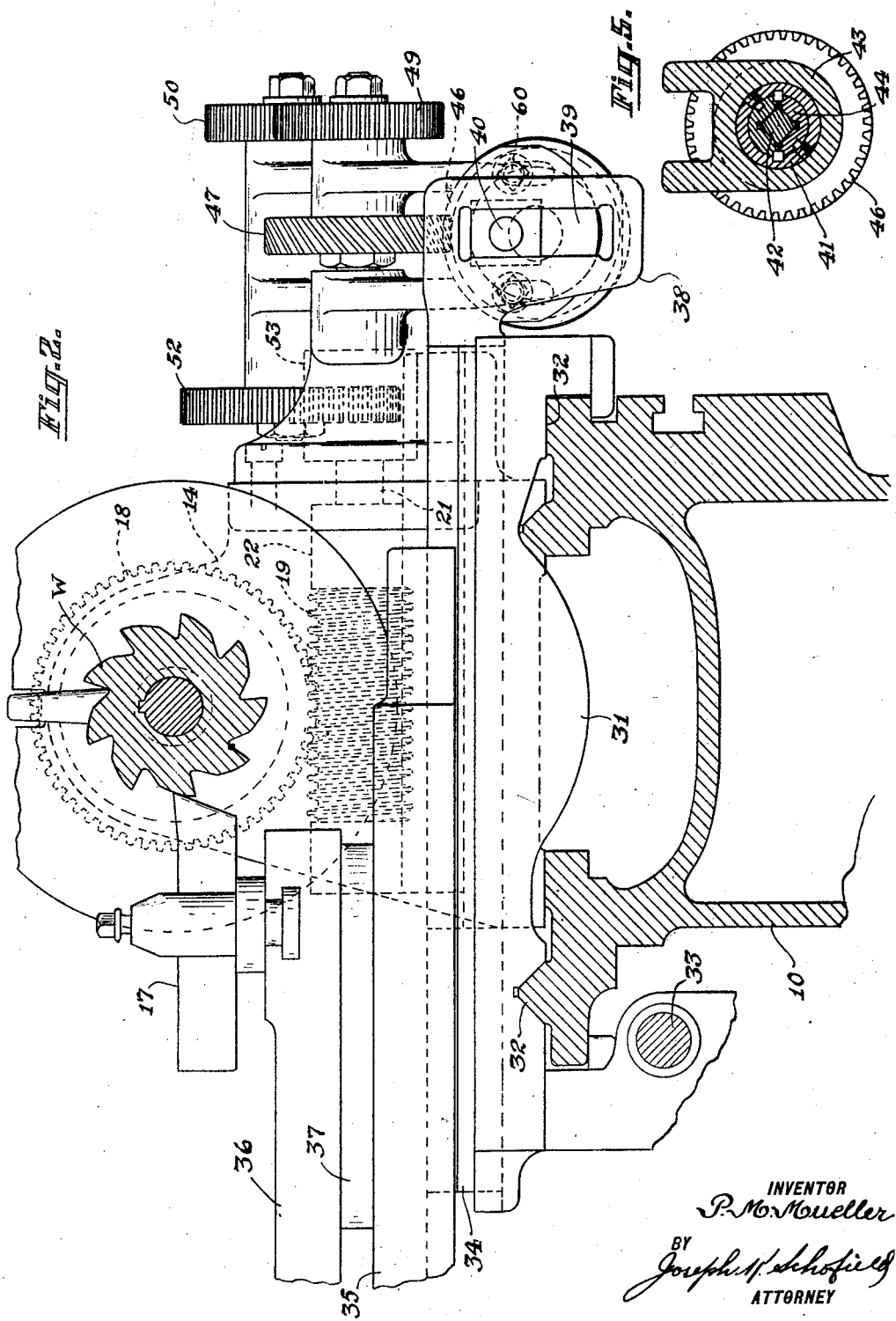

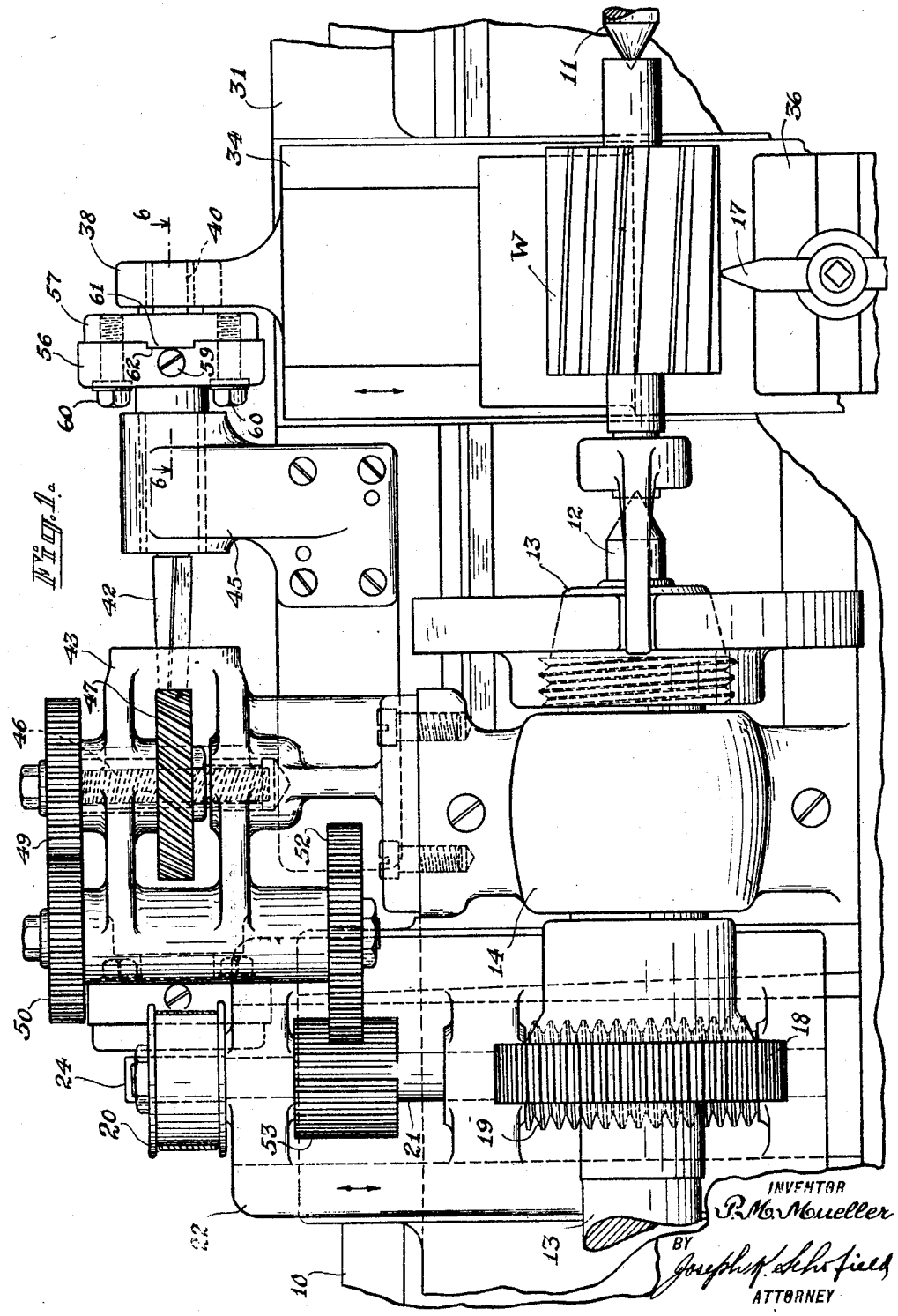

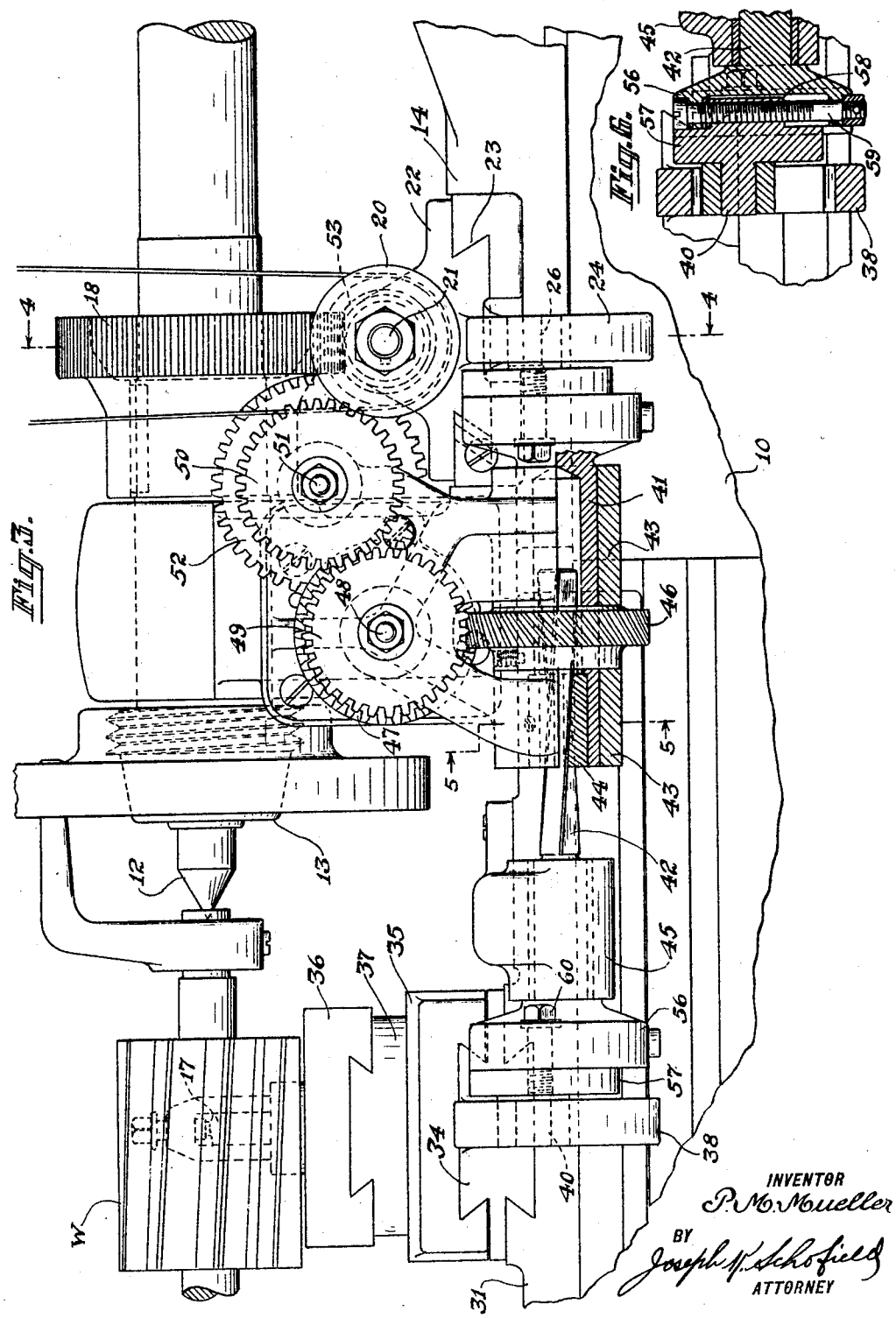

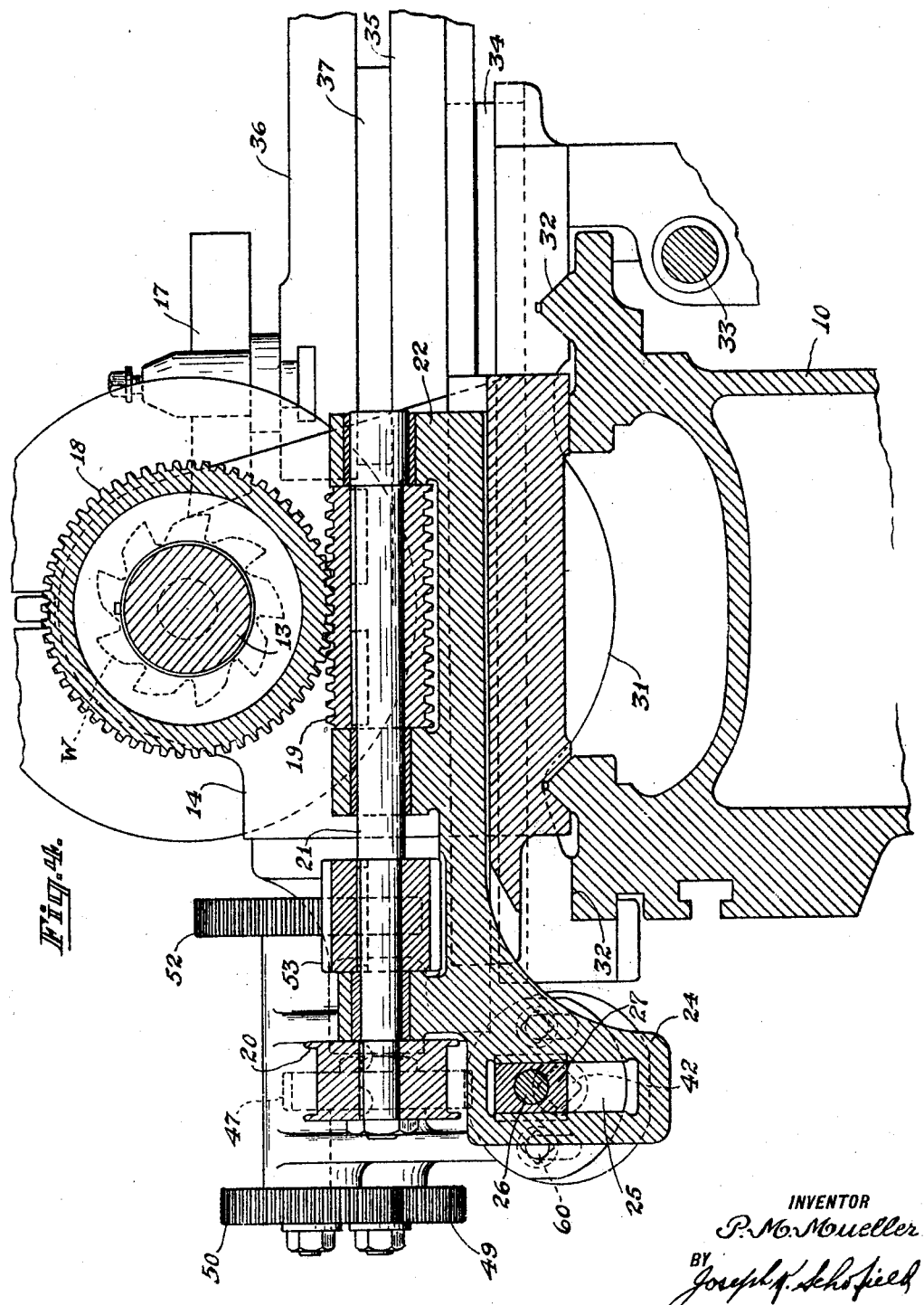

Patented Jan. 29, 1929.

1,700,327

UNITED STATES PATENT OFFICE.

PAUL M. MUELLER, OF HARTFORD, CONNECTICUT, ASSIGNOR TO PRATT & WHITNEY COMPANY, OF NEW YORK, N. Y., A CORPORATION OF NEW JERSEY.

RELIEVING MECHANISM FOR LATHES.

Application filed December 29, 1924. Serial No. 758,688.

This invention relates to relieving lathes in which the spindle carrying the cutter being relieved is rotated and the cutting tool moved radially in timed relation to each other to permit rapid operation.

It further relates to a relieving lathe in which the work supporting and rotating spindle may be rotated at variable velocities during each revolution thereof simultaneously with the reciprocatory movements of a cutting tool toward and from the axis of rotation of the work.

A principal object of the invention is to provide a relieving machine permitting milling and other cutters to have their relieved cutting surfaces rapidly formed to a high precision, the mechanism provided therefor being adjustable for operating upon milling cutters of different form, different amounts of relief and numbers of teeth.

Another object of the invention is to reciprocate the cutting tool at variable velocities corresponding substantially to simple harmonic motion and obtained from a rotating crank and also to rotate the spindle in timed relation thereto so that relieved surfaces will be formed on each of the teeth of the cutter during a part of the rotative motion of the spindle, and, between the cutting engagement of the tool with the work blank, the tool will be rapidly withdrawn.

One feature which is advantageous is that all motions of the mechanism in addition to a constant rotative motion imparted to the work spindle are derived from cranks constantly rotated and adapted to be adjusted so that the movement imparted to their slides may be widely varied.

Another feature of advantage is that the ratio between the rotating means for the spindle and the means for actuating the cranks may be varied to adapt the mechanism for cutters having different numbers of teeth.

Another principal object of the invention is to provide novel means for imparting an irregular rotative motion to the work spindle, these means combining a constant speed of rotation and also a simultaneous oscillatory moton, the combined resultant movement being a periodically recurring fast and slow rotative motion during each revolution of the spindle.

A further object of the invention is to provide adjustments permitting the number of variations in the rotative moton of the spindle being widely varied for blanks having different numbers of teeth; also to vary the differences in speed between the fast and slow motions of the spindle.

With these and other objects in view, my invention consists in the features of construction and operation set forth in the following specification and illustrated in the accompanying drawings.

In the accompanying drawings annexed hereto and forming a part of this specification, I have shown my invention embodied in a milling cutter relieving mechanism but it will be understood that the invention can be otherwise embodied and that the drawings are not to be construed as defining or limiting the scope of the invention, the claims appended to this specification being relied upon for that purpose.

In the annexed drawings:

Figure 1 is a plan view of the complete relieving mechanism forming the basis of the present invention.

Fig. 2 is a side elevation of the complete mechanism looking from the right hand end of Fig. 1.

Fig. 3 is a rear elevation of the complete mechanism.

Fig. 4 is a transverse sectional view taken on line 4—4 of Fig. 3.

Fig. 5 is a sectional view taken on line 5—5 of Fig. 3, and

Fig. 6 is a sectional view of one of the adjustable cranks taken on line 6—6 of Fig. 1.

In the above drawings, I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: first, supporting means for a work blank permitting it to be rotated about a fixed axis; second, a cutting tool mounted so that it is adapted to be reciprocated directly toward and from the axis of rotation of the work blank and also adapted to be movable longitudinally along the work; third, means to rotate the work spindle at a constant speed and means to actuate said rotating means in a manner to vary their rotative effect upon the spindle whereby the work spindle may, during each revolution, be given variable speeds; fourth, a crank for effecting reciprocatory movements of the tool toward and from the axis of the blank; fifth, a second crank to actuate the work spindle rotating mechanism; sixth, means to adjust the length of travel imparted by the cranks; and seventh, means to rotate the cranks at variable speeds relative to the speed of rotation of the work spindle rotating means.

Referring more in detail to the figures of the drawing, my invention is shown applied in mechanism mounted upon a lathe base 10 of standard form. A tailstock center 11 in a tailstock, not shown, may be used to support one end of the work blank W, the opposite end being supported by a center 12 in a spindle 13 mounted in a headstock 14 of special form shown in detail in the drawings. A tool carriage of conventional form may be used on which is mounted a cross slide of special form for controlling the reciprocatory movements of the cutting tool 17. These will be described in detail at a later part of the specification. Referring first to Figs. 1 and 3, the work spindle 13 is supported in headstock 14 in suitable bearings so that the spindle 13 is adapted to be rotatable by any desired means. In order to rotate the headstock spindle 13 and the work blank W, the spindle has mounted thereon a gear 18 in mesh with a worm 19.

The worm 19 is rotatable about an axis transverse to the work spindle 13 and is constantly in mesh with the gear 18 on the spindle. During operation, the worm 19 is constantly rotated by means of a pulley 20 mounted on the rear end of the shaft 21 carrying the worm 19. This worm 19 is also adapted to be bodily reciprocated in alignment with its own axis. For this purpose, the worm shaft 21 is mounted upon a slide 22 preferably retained in a dovetail way 23 provided in the headstock 14. In order to reciprocate the slide 22, it is provided with a depending member 24 having a vertical slot 25 therein which operates a crank 26. Preferably a shoe 27 surrounds the crank pin and closely engages the walls of the slot 25. The method of actuating this crank 26 will presently be described. From the above described mechanism, it will be seen that the worm 19, while constantly being rotated by the pulley 20 provided on one end of shaft 21, is simultaneously reciprocated together upon its slide 22. The resultant motion imparted to the work spindle 13 will be an irregular or periodically recurring variable speed of rotation throughout each rotation. The rotation of the spindle will be effected both by the relative speed of reciprocation of the slide and also its length of reciprocatory motion, both of which are variable by means to be presently described. In other words, the difference between the maximum and minimum speeds of rotation of the spindle 13 will be controlled by the amplitude of movement of the slide 22 as well as by the number of reciprocations of this slide during each rotation of the work spindle.

In order to actuate the cutting tool 17 it is, as usual in lathes, mounted upon a tool carriage 31, movable longitudinally along the lathe base 10 upon suitable ways 32. To effect this movement, a lead screw 33 is provided directly engaging the tool carriage 31 so that rotation of the screw 33 will slowly feed the cutter 17 axially along the work W being relieved. As any usual method of rotating the lead screw 33 may be employed which is used in lathes, no means will be described. In addition to its longitudinal feeding movement, the tool 17 is given a reciprocatory movement toward and from the axis of rotation of the work W and for this purpose the tool 17 is mounted upon a slide 34 preferably as shown in Figs. 2 and 3. The specific construction shown includes an intermediate slide 35 carrying another slide 36 upon a compound tool rest 37. Adjustments of the tool 17 for work blanks W of different diameters may be accomplished by means of the slide 36 and the reciprocatory movements of the tool to impart its relieving movements may be accomplished by reciprocating the slide 34. For this purpose, the intermediate slide 34 at its rearward part is provided with a downward extending projection 38 provided with a vertical slot 39. Within this slot 39 is adapted to be actuated a crank pin 40, the distance from its center of rotation being adjustable so that the slide 34 may be reciprocated greater or less distances in accordance with the amount of relief desired.

In order to actuate the two cranks 26 and 40 they are mounted upon shafts 41 and 42 in alignment with each other. As the tool 30 must be fed longitudinally along the work blank W, the driving means for its crank 40 is provided with a telescoping connection, as shown most clearly in Fig. 3. The shaft 41 for rotating the worm reciprocating slide 22 is in the form of a sleeve rotatably mounted in suitable bearings 43 in a part in an extension mounted on the headstock 14. Extending through a squared portion 44 of the sleeve 41 in a recess formed therein is a squared extension of a shaft 42 mounted to rotate in a bearing 45 provided on an extension to the tool carriage 31. The two cranks 26 and 40 are therefore always rotated at exactly the same speed and one may be moved toward or away from the other during the feeding movements of the carriage 31 due to the squared shaft 42 engaging the corresponding squared aperture 44 in the sleeve 41. In order to rotate these cranks 26 and 40 at any predetermined speed, the sleeve 41 is provided with a helical gear 46 suitably keyed thereto and in mesh with a corresponding helical gear 47 upon a shaft 48 at right angles to the sleeve 41. This shaft 48 carries a gear 49 in mesh with a gear 50 on an intermediate shaft 51. A second gear 52 on intermediate shaft 51 engages an elongated gear 53 on the worm shaft 21. Through these geared connections the crank shaft 41 and its extension 42 will always be constantly rotated, the ratio between the rotative movement of the worm 19 and the crank shaft 41 being controlled by the gears 49 and 50 interposed in the driving connections for the shaft 41 and which may be readily changed for gears of other ratios.

Referring to Fig. 6 of the drawings, a detail of the adjustable crank 40 is shown. As this is substantially identical to the crank 26 and connected parts, a description of one will suffice for both. The shaft 42 at one end is provided with a flange or head 56 having a recessed portion in its center. Fitted against this face of the head 56 is a plate member 57 preferably having the crank 40 formed integrally thereon. A central boss on the plate 57 enters the recess in the head 56 and, extending through the head 56 and boss 58, is a screw 59. This is threaded through the boss 58 but is free to rotate without engagement of its threads with holes provided in the head. Rotation of the screw 59 will therefore move the plate transversely of the head and thus vary the radius of revolution of the crank pin 40. To hold the plate 57 in adjusted position, clamping screws 60 threaded into the head 56 and passing through elongated slots in the plate 57 are provided. To aid in guiding the plate and holding it rigidly in position, a tongue 61 and groove 62 may be provided as shown clearly in Fig. 1.

From the above described mechanism, it will be seen that while the worm shaft 21 is constantly rotated, the crank shafts 41 and 42 will be rotated at a constant speed for any one set of geared connections 49 and 50, but that this may be variable in accordance with the ratios of these driving connections between the two shafts. Also, rotation of crank shaft 41 will simultaneously reciprocate the slide 22 carrying the worm 19 and through shaft 42 will actuate also the slide 34 carrying the cutting tool 17. The reciprocatory movements of the two slides 22 and 34 are always in the same phase relation to each other as the cranks 26 and 40 are disposed always in alignment with each other. The resultant movements imparted to the tool 17 and work W permits the tool to cut the relieved or backed-off portions of the teeth on the cutter and, between the teeth, rapidly move outward for the relieving movement on the adjacent tooth. By varying the ratio between gears 49 and 50 the mechanism may be adapted to operate on cutters having different numbers of teeth. Also by varying the position of the crank 40 or both cranks 26 and 40, the amount of relieving or backing off on each tooth may be widely varied.

In the cutter W shown in the drawings, the cutting surfaces are helicoidal and for that reason the relieving action of the tool must be advanced as the tool 17 is fed axially along the blank W toward the headstock 14. To effect this slight advancing motion of the tool 17 relative to the work W the squared shaft 42 is preferably twisted so that the sides are helicoidal and extend in the same direction as the cutting surfaces on the cutter. Any other means may be employed for this purpose such as a differential gearing controlled by axial movement of the carriage 31. The function is to merely co-ordinate the relieving motions of the tool with the cutting surfaces of the cutter.

What I claim is:

1. A relieving mechanism for lathes comprising in combination, a base, a headstock, a work supporting spindle therein, a carriage movable along the base, a cross slide on said carriage, a cutting tool on said cross slide, means to rotate the work spindle, crank means to oscillate the work spindle about its axis simultaneously with its rotative motion to impart an irregular rotative motion, crank means to reciprocate the cross slide during the rotative motion of the work spindle, and common driving means for said spindle rotating and tool reciprocating means.

2. A relieving mechanism for lathes comprising in combination, a base, a headstock, a work supporting spindle therein, a carriage movable along the base, a cross slide on said carriage, a cutting tool on said cross slide, means to rotate the work spindle, means to oscillate the work spindle about its axis simultaneously with its rotative motion to impart an irregular rotative motion, means to vary the amount of oscillatory motion of the spindle, and means to reciprocate the cross slide during the rotative motion of the work spindle.

3. A relieving mechanism for lathes comprising in combination, a base, a headstock, a work supporting spindle therein, a carriage movable along the base, a cross slide on said carriage, a cutting tool on said cross slide, means to rotate the work spindle, means to oscillate the work spindle about its axis simultaneously with its rotative motion to impart an irregular rotative motion, means to reciprocate the cross slide during the rotative motion of the work spindle, and means to vary the amount of reciprocatory movement of the cross slide.

4. A relieving mechanism for lathes comprising in combination, a base, a headstock, a work supporting spindle therein, a carriage movable along the base, a cross slide on said carriage, a cutting tool on said cross slide, a worm wheel on said spindle, a constantly rotating worm to rotate said worm wheel and spindle, means acting simultaneously to axially move the worm in timed relation to its rotative motion to cause an irregular rotative movement of the spindle, and means to reciprocate the cross slide during the rotative motion of the work spindle.

5. A relieving mechanism for lathes comprising in combination, a base, a headstock, a work supporting spindle therein, a carriage movable along the base, a cross slide on said carriage, a cutting tool on said cross slide, a worm wheel on said spindle, a constantly rotating worm to rotate said worm wheel and spindle, means acting simultaneously to axially move the worm in timed relation to its rotative motion to cause an irregular rotative movement of the spindle, means to vary the axial movement of the worm, and means to reciprocate the cross slide in timed relation to and during the rotative motion of the work spindle.

6. A relieving mechanism for lathes comprising in combination, a base, a headstock, a work supporting spindle therein, a carriage movable along the base, a cross slide on said carriage, a cutting tool on said cross slide, a worm wheel on said spindle, a constantly rotating worm to rotate said worm wheel and spindle, means acting simultaneously to axially move the worm in timed relation to its rotative motion to cause an irregular rotative movement of the spindle, means to reciprocate the cross slide during the rotative motion of the work spindle, and means to vary the axial movement of the worm and the movement of the cross slide.

7. A relieving mechanism for lathes comprising in combination, a base, a headstock, a work supporting spindle therein, a carriage movable along the base, a cross slide on said carriage, a cutting tool on said cross slide, a worm wheel on said spindle, a constantly rotating worm to rotate said worm wheel and spindle, means to axially reciprocate the worm in timed relation to its rotative motion to oscillate the spindle, means to reciprocate the cross slide during the rotative motion of the work spindle, a shaft for driving the worm reciprocating and cross slide reciprocating means, and means to vary the rotative movement of the shaft relative to the movement of the spindle.

In testimony whereof, I hereto affix my signature.

PAUL M. MUELLER.